March 29, 1966  A. R. B. NASH  3,242,945
CHANGE-OVER VALVES WITH RESILIENT CONNECTION MEANS
Filed Dec. 17, 1963  2 Sheets-Sheet 1

March 29, 1966  A. R. B. NASH  3,242,945
CHANGE-OVER VALVES WITH RESILIENT CONNECTION MEANS
Filed Dec. 17, 1963  2 Sheets-Sheet 2

United States Patent Office 3,242,945
Patented Mar. 29, 1966

3,242,945
CHANGE-OVER VALVES WITH RESILIENT
CONNECTION MEANS
Alan Richard Brine Nash, 39 Abbots Ride,
Farnham, Surrey, England
Filed Dec. 17, 1963, Ser. No. 331,265
Claims priority, application Great Britain, Dec. 19, 1962,
47,857/62
18 Claims. (Cl. 137—596.17)

This invention relates to change-over valves, that is to say, valves which can be used to control the flow of a liquid or gas to a reversible air motor or actuator or like fluid mechanism and which enables one end of a double-acting cylinder or actuator to be filled with fluid under pressure and the other end to be open to exhaust or vice versa.

A known form of valve for this purpose is the shuttle valve in which a valve body having a series of lands slides in a cylindrical chamber having ports for the various fluid connections to be made. With this construction, since, for example, correct operation is dependent on the alignment of a single rigid element with the various ports of the chamber, considerable accuracy of construction is required and wear of the parts can have a marked effect on the efficiency of the valve.

According to the present invention, there is provided a change-over valve comprising a pair of valve chambers each having pressure fluid inlet and outlet ports and an exhaust opening, respective valve bodies in the chambers being conjointly movable so that they alternately seal off the inlet port and the exhaust opening of their chambers, resilient means connecting the valve bodies to a common operating member which may itself be resiliently mounted to transmit a force to each body when it seats upon its inlet port to assist the sealing thereof.

Conveniently, the valve bodies may have conical or spherical portions forming their sealing faces and a stem extending from one of said portions can then project through the opening to atmosphere for connection of the body to the operating member. It is also possible to arrange the valve chambers side-by-side so that the valve bodies are connected to the operating member through resilient lateral extensions of the member.

Figure 1:
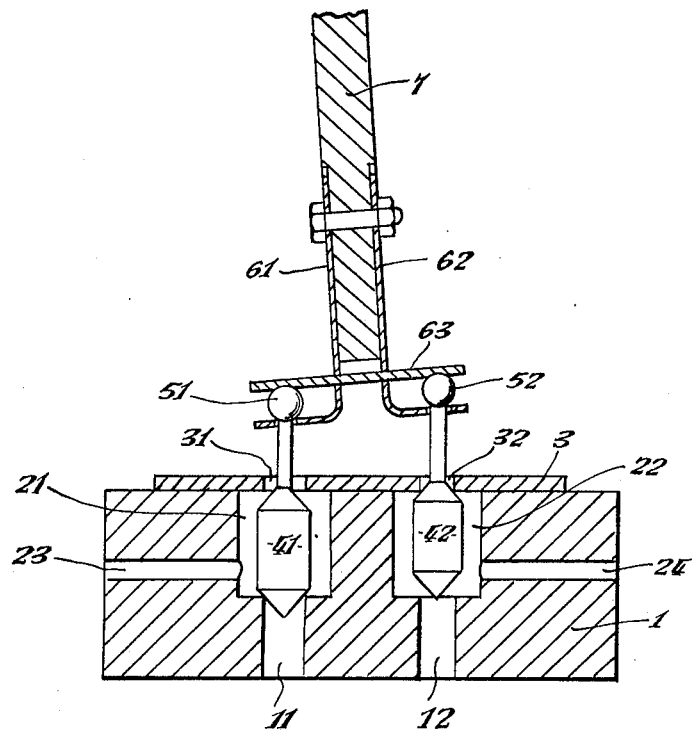
Figure 2:
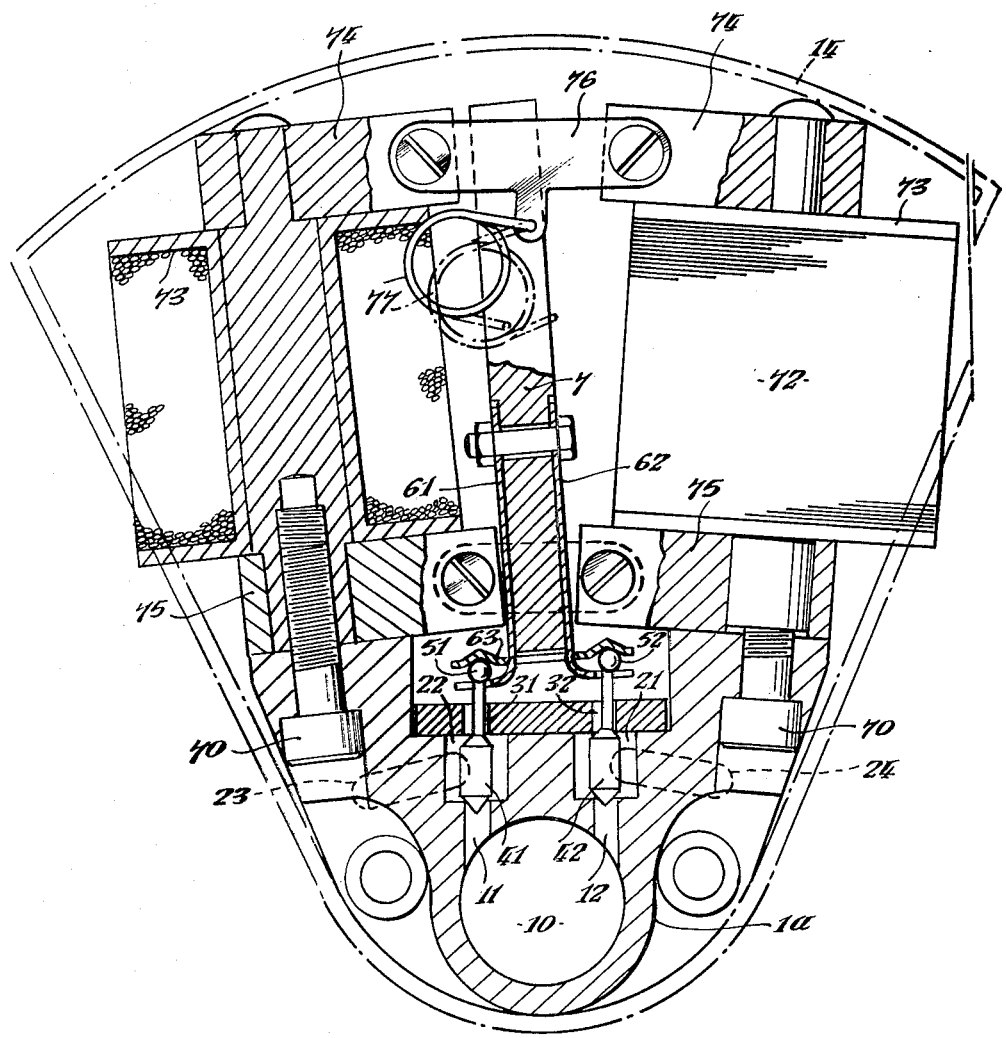

The invention will be more particularly described with reference to the accompanying drawings wherein:

FIG. 1 is a sectional view of a change-over valve according to the invention and FIG. 2 is a similar view of a modified form of the valve in FIG. 1.

Referring to FIG. 1 of the drawings, a valve block 1 has formed in it two cylindrical chambers 21, 22 the upper ends of which are closed by a cover plate 3 in which exhaust ports 31, 32 are formed. Opposite the exhaust ports, inlet ports 11, 12 are provided in the valve block 1 concentric with the chambers 21, 22 and are connected to a supply point (not shown) for pressure gas or liquid. In addition, the side walls of the chambers 21, 22 have outlet ports 23, 24 communicating with ports of the mechanism (not shown) to be controlled by the valve.

Within the chambers, respective valve bodies 41, 42 are movable axially and have conical or spherical seating faces which can stop the flow of fluid either through the exhaust port or through the inlet port. These bodies have necked extensions passing through the exhaust ports and terminating in spherical heads 51, 52 retained between resilient strips 61, 62 and 63 which have suitable seatings formed in them to receive the heads. Strips 61, 62 are clamped to operating lever 7 by a loosely fitting bolt permitting a small degree of adjustment of the strips.

The lever 7 is supported so that it is able to rotate in the plane of the paper and its support is preferably so arranged that it can be displaced vertically relative to the block but it should be restrained laterally at its pivot center. In the illustrated example, this may be done by so forming the spring strip 63 and attaching it to the valve block that the rotational freedom of the lever is not unduly restrained. By this means, the strip 63 can exert a force on the lever urging it towards the valve block and compensate for the pressure exerted on the valve bodies by the pressure fluid. Alternatively, a separate support (not shown) such as a simple pivot mounting, e.g., through the strip 63, may be provided for the lever 7 near the spring strips.

It will be seen that when the lever 7 is rotated in an anti-clockwise direction, the valve body 41 will close its associated inlet port and outlet port 23 will be open to exhaust. At the same time, the body 42 will be pulled upwards and will close its exhaust port 32 so that outlet port 24 is in communication with the pressure source through the inlet port 12. Evidently, the reverse effect occurs when the operating lever is rotated in the clockwise direction. It will be noted that the resilience of the spring strips 61, 62 and 63 can accommodate a small amount of overtravel of the operating lever and can also compensate for minor dimensional inaccuracies in the valve bodies and their seatings.

In the general case, the particular valve body seating on its exhaust outlet will be held there by the fluid pressure in its chamber. There must, additionally, be a moment on the operating member about that seating to urge the other body into sealing engagement with its inlet port against the fluid pressure there. The particular arrangements for supporting the lever described above illustrate how this condition can be achieved. As a further alternative, when the strip 63 is secured to the lever and the lever is separately supported in such a manner as to permit vertical movement, it may provide the pressure-compensating force by a separate spring (as shown in FIG. 2) of the over-center type giving a bi-stable action so that additionally, there is a positive force retaining the lever in the end position to which it is moved and thereby holding the parts in either of the two positions described.

In the construction shown in FIG. 2, the change-over valve is illustrated in position on a rotary actuator 14 of the swinging vane type, which, however, forms no part of the present invention, and parts of the valve similar to those described above have been given the same reference numerals.

A fluid pressure inlet chamber 10 has the bores 11, 12 leading from it to the two valve chambers 21, 22 and the outlet ports 23, 24 are directed to the rear face of the valve to communicate with ports (not shown) of the actuator.

In this example, the valve is arranged for powered operation and the valve body 1a has secured to it by bolts 70 a pair of electro-magnets formed by symmetrically disposed solenoid coils 72 wound on bobbins 73 to the ends of which upper and lower pole pieces 74, 75 fit. The operating member is made of iron and forms the armature of the arrangement. A pair of bridging brackets 76 span the upper pole pieces 74 and front and rear coil springs 77 are attached between the brackets and opposite sides of the operating member the member 7 being otherwise unattached to the body save, of course, through the springs 61, 62, 63. Excitation of one or other of the solenoids pivots the operating member to move the valve bodies 41, 42 in the manner described in the first example and s direct pressure fluid to one side or the other of the actuator 14.

If the required solenoid, e.g., that of the left-hand side of FIG. 2, is continuously energised, this will provide a moment acting about the right-hand exhaust seating to urge the left-hand valve body onto its inlet seating. In the illustrated embodiment, however, it will be seen that the springs 77 have an over-center action, their position when the operating member is moved anti-clockwise being shown in full lines and, when the operating member is moved clockwise, in chain-dotted lines. As described above, they tend to stabilize the operating member after actuation of the valve and retain it in the position to which it has been moved. As in the first-described example the resilient connections of the member 7 and the bodies 41, 42 allow minor dimensional inaccuracies and overtravel of the member to be accommodated without impairing the operation of the valve.

What I claim and desire to secure by Letters Patent is:

1. A change-over valve comprising, in combination, a valve block, two spaced valve chambers in the block, porting to each chamber including pressure inlet, pressure outlet and exhaust openings, the pressure inlet and exhaust openings being located in axially opposite end faces of each chamber and a valve body in each chamber having respective end sealing faces for the pressure inlet and exhaust openings of the chamber, said faces being tapered relative to said openings, extensions from said bodies projecting outwardly of their chambers through the exhaust openings thereof and resilient gripping elements engaging said extensions and maintaining them in laterally spaced relation to the exhaust openings of the valve block, a common operating member connected to said elements and means supporting the member upon the valve block, said means permitting operation of the member to move the valve bodies so that they seal off alternately the inlet and exhaust openings of their respective chambers.

2. A valve according to claim 1 wherein at least one of the resilient elements comprises the supporting means for the member, said at least one element being connected to the valve block, at least two other elements of the resilient elements being secured to the member in spaced relation to said at least one element and the ends of the valve body extensions being sandwiched between said at least one element and said at least two elements, said at least one element transmitting a force to the valve body seating upon an inlet opening to urge the body into sealing engagement thereupon.

3. A valve according to claim 1 wherein each valve body has tapering end portions of circular cross-section forming its sealing faces and said extension comprises a stem extending integrally from one of said portions through the exhaust opening to its engagement with the resilient elements.

4. A change-over valve comprising, in combination a housing, two spaced chambers in the housing each having opposed openings for the inlet and output of pressure fluid and a further opening to exhaust, a valve body in each chamber and said inlet and exhaust openings forming opposed abutments for the valve body, said bodies being axially movable between end positions closing, respectively, the pressure inlet and exhaust openings, said bodies having externally directed stems, an operating lever for the bodies, resilient means connected to the lever comprising gripping elements engaging and holding said stems, said resilient means permitting relative axial movement of the lever and stems whereby overtravel of the lever can be accommodated and axial compensation may be provided for minor dimensional inaccuracies in the valve bodies and their seatings, attachment means supporting the lever upon the housing the lever being rockable on the attachment means between one end position in which one valve body is positioned to seal its inlet opening and the other body is positioned to seal its exhaust opening and a second end position in which the positions of the bodies in their respective chambers is reversed, the attachment means of the lever to the housing including an over-center spring acting to retain the lever in each end position after movement thereto.

5. A valve according to claim 4 wherein the valve chambers are arranged side-by-side in the housing and the inlet and exhaust openings are formed in opposite ends of each chamber, each valve body having circular cross-section tapered ends which can seal said openings and provide lateral location for their respective bodies, the tapered end for the exhaust opening having a central axial stem extending through said opening for attachment to the resilient means.

6. A valve according to claim 4 having a magnetisable supporting structure secured to the housing and carrying solenoids on each side of the lever, the lever being movable between its end positions by excitation of each solenoid, said supporting structure including a central member securing one end of the over-center spring the other end of which is secured to the lever.

7. A change-over valve comprising, in combination, a valve block, two valve chambers arranged side-by-side in said block and having at similar ends pressure fluid inlet ports, at opposite ends thereto exhaust ports and intermediate said ends pressure outlet ports, respective valve bodies in said chambers movable between inlet port sealing and exhaust port sealing positions, said bodies including ball-ended stems extending through the exhaust ports, a common operating lever for the valve bodies and resilient means attached to the lever engaging and gripping said ball ends to support them both laterally and axially, holding means supporting the lever relative to the valve block, the lever being rockable on the holding means between first and second end positions in which each body is in turn seated upon its associated inlet port while the other body is seated upon its exhaust port.

8. A valve according to claim 7 wherein the holding means comprises further resilient means connected between the lever and the valve block permitting displacement of the lever parallel to the valve stems and urging the lever towards the inlet ports of the chamber.

9. A valve according to claim 8 wherein said further resilient means includes a coil spring attached between the lever and the valve block, said spring being of the over-center type and thereby providing also a transverse force which stabilises the lever in its respective end positions.

10. A change-over valve comprising, in combination, a valve block, two spaced valve chambers arranged side-by-side in the block, porting to each chamber including pressure inlet, pressure outlet and exhaust openings, said pressure inlet and exhaust openings being placed opposite each other in each chamber, a valve body in each chamber directed co-axially to said inlet and exhaust openings and having respective sealing faces for said inlet and exhaust openings, a stem on each body extending through the associated exhaust opening with a clearance permitting fluid flow through the opening when the associated valve body sealing face is out of engagement therewith, a common operating member for the valve bodies, said resilient connecting elements taking the form of leaf springs laterally extending from opposite sides of the operating member which is pivotally moveable to change over the valve body portions, each body stem terminating in a ball end remote from the body sealing faces, said laterally extending leaf springs taking the form of a pair of spaced cantilever elements on each side of the operating member, the stem ball ends being gripped between said cantilever elements on the respective adjacent sides of the operating member.

11. A valve according to claim 10 wherein the valve chambers comprise parallel bores in the valve block from an end face thereof, a cover plate sealingly secured to said face having two apertures registrable with but smaller than said bore, said apertures forming the respective exhaust ports of the valve chambers.

12. A valve according to claim 10 wherein resilient attachment means are secured to the member and to the valve block to connect the member to the block, the attachment means being arranged to urge the member towards that one of said valve bodies seating upon its associated inlet port.

13. A change-over valve comprising, in combination, a valve block, two spaced valve chambers located parallel to each other in the block, porting to each chamber including pressure inlet, pressure outlet and exhaust openings, the pressure inlet and exhaust openings of the chambers being in respective substantially parallel planes, a valve body in each chamber movable transversely to said planes and tapered sealing faces at opposite ends of each valve body for closing said inlet and exhaust openings, respective valve body stems projecting from the center of the valve bodies' exhaust opening sealing faces and extending through their associated exhaust openings, an operating lever located centrally between said chambers and projecting beyond the exhaust openings thereof, resilient means mounting the lever to said valve block so as to urge the lever towards the chambers, a pair of parallel leaf spring elements secured at one end of the lever and projecting laterally on each side of the lever from said secured ends, a protuberance at the end of each stem remote from the valve body, each protuberance being gripped between the leaf spring elements on the adjacent side of the lever and being thereby located adjacent the ends of the elements remote from the lever, said lever being rockable on its resilient mounting means to move the valve bodies, through said leaf spring elements and stems, so that the bodies seal off alternatively the inlet and exhaust openings of their respective chambers.

14. A valve according to claim 13 wherein each valve body is integral with its seating faces and stem.

15. A valve according to claim 13 wherein respective solenoids are secured relative to the valve block to lie adjacent opposite sides of the lever, said solenoids being separately energizable to actuate said rocking movement of the lever.

16. A change-over valve comprising, in combination, a housing, two spaced chambers in the housing each having openings for the inlet and output of pressure fluid and a further opening to exhaust, a valve body in each chamber movable between end positions closing, respectively, the pressure inlet and exhaust openings, said bodies having externally directed stems, an operating lever for the bodies, resilient means connected to the lever engaging said stems, a magnetizable supporting structure secured to the housing, respective solenoids disposed on each side of the lever and carried by said structure, attachment means supporting the lever upon the housing and said structure, the lever being rockable on the attachment means by excitation of each solenoid between one end position in which one valve body is positioned to seal its exhaust opening and a second end position in which the positions of the bodies in their respective chambers is reversed, the attachment means including an over-center spring acting to retain the lever in each end position after movement thereto, said supporting structure including a central member securing one end of the over-center spring the other end of said spring being secured to the lever.

17. A change-over valve comprising, in combination, a valve block, two valve chambers arranged side by side in said block and each having at similar axially opposite ends a pressure fluid inlet port and an exhaust port and at an intermediate location between said ends a pressure outlet port, respective valve bodies in said chambers axially movable between inlet port sealing and exhaust port sealing positions, each body having a stem extending through its exhaust port, a common operating member for the valve bodies extending beyond the exhaust ports and resilient means connecting said member to the valve body stems to permit resilient axial displacement of each valve body relative to the member, a supporting structure fixed relative to the valve block and carrying respective solenoids on each side of the operating member, the lever being movable by energization of the respective solenoids between alternative end position in which the exhaust port of one chamber is closed and the pressure inlet port of the other chamber is open, said spring being arranged to assist said lever movement past a central position between said end positions and to apply an axial force upon the lever urging it towards the valve chambers.

18. A change-over valve comprising, in combination, a valve block, two spaced valve chambers in the block, porting to each chamber including pressure inlet, pressure outlet and exhaust openings, the pressure inlet and exhaust openings being located in axially opposite end faces of each chamber and a valve body in each chamber having respective end sealing faces, the pressure inlet and exhaust openings of the chamber being arranged to receive said sealing faces and there being a relative taper in the axial direction between each opening and its associated sealing face, extensions from said bodies projecting outwardly of their chambers through the exhaust openings thereof and series of resilient elements engaging said extensions to maintain them in laterally spaced relation to the exhaust openings of the valve block, a common operating member connected to said series of elements, at least one element of said series being additionally connected to the valve block, the ends of the valve body extensions being gripped between respective pairs of elements of said series, operation of said member being arranged to move the valve bodies so that they seal off alternately the inlet and exhaust openings of their respective chambers and said at least one element transmitting a force to the valve body seating upon an inlet opening to urge the body into sealing engagement thereupon.

References Cited by the Examiner
UNITED STATES PATENTS

| | | | |
|---|---|---|---|
| 2,243,937 | 6/1941 | Almond | 251—75 X |
| 2,247,773 | 7/1941 | Dunn | 251—85 X |
| 2,743,738 | 5/1956 | Johnson | 251—75 X |
| 2,867,235 | 1/1959 | Hupp | 137—596.1 |
| 3,099,289 | 7/1963 | Neilson et al. | 137—596 |

MARTIN P. SCHWADRON, *Primary Examiner.*